(12) United States Patent
Kawaguchi

(10) Patent No.: US 12,625,501 B2
(45) Date of Patent: May 12, 2026

(54) DELIVERY SYSTEM, DELIVERY METHOD, AND AUTOMATIC TRANSFER DEVICE

(71) Applicant: FUJI CORPORATION, Chiryu (JP)

(72) Inventor: Koji Kawaguchi, Kasugai (JP)

(73) Assignee: FUJI CORPORATION, Chiryu (JP)

( * ) Notice: Subject to any disclaimer, the term of this patent is extended or adjusted under 35 U.S.C. 154(b) by 100 days.

(21) Appl. No.: 18/690,924

(22) PCT Filed: Sep. 21, 2021

(86) PCT No.: PCT/JP2021/034537
§ 371 (c)(1),
(2) Date: Mar. 11, 2024

(87) PCT Pub. No.: WO2023/047454
PCT Pub. Date: Mar. 30, 2023

(65) Prior Publication Data
US 2024/0393799 A1 Nov. 28, 2024

(51) Int. Cl.
*G05D 1/24* (2024.01)
*B60L 53/00* (2019.01)
*B60S 3/04* (2006.01)
*G05D 105/28* (2024.01)

(52) U.S. Cl.
CPC ................. *G05D 1/24* (2024.01); *B60S 3/04* (2013.01); *B60L 53/00* (2019.02); *G05D 2105/28* (2024.01)

(58) Field of Classification Search
CPC .............................................. B60S 3/00–066
See application file for complete search history.

(56) References Cited

U.S. PATENT DOCUMENTS

| | | | |
|---|---|---|---|
| 6,504,610 B1 | 1/2003 | Bauer et al. | |
| 2015/0020343 A1 | 1/2015 | Shibata et al. | |
| 2018/0275668 A1 | 9/2018 | Diehr et al. | |
| 2018/0368312 A1 | 12/2018 | Strang | |
| 2019/0391589 A1 | 12/2019 | Komorida et al. | |
| 2020/0324662 A1 | 10/2020 | Väin et al. | |
| 2021/0146889 A1* | 5/2021 | Kuehne | G05D 1/0225 |

(Continued)

FOREIGN PATENT DOCUMENTS

| | | | |
|---|---|---|---|
| CN | 112294192 A | 2/2021 | |
| DE | 102020121526 A1 * | 2/2022 | B08B 1/34 |
| JP | 2001-508572 A | 6/2001 | |

(Continued)

OTHER PUBLICATIONS

International Search Report Issued Dec. 7, 2021, in PCT/JP2021/034537, filed on Sep. 21, 2021, 2 pages.

Primary Examiner — Aaron L Troost
(74) *Attorney, Agent, or Firm* — Oblon, McClelland, Maier & Neustadt, L.L.P.

(57) ABSTRACT

A delivery system for delivering an article includes: an automatic transfer device configured to automatically move the article in a specific space; a standby space where the automatic transfer device is on standby is provided in the specific space; and a cleaning device disposed in the standby space. The automatic transfer device includes a detection section configured to detect surroundings, a drive section, and a control section configured to control the drive section. The cleaning device is configured to clean the automatic transfer device while the automatic transfer device is on standby.

9 Claims, 6 Drawing Sheets

(56)          References Cited

U.S. PATENT DOCUMENTS

2021/0215811 A1     7/2021  Couture et al.

FOREIGN PATENT DOCUMENTS

| | | | |
|---|---|---|---|
| JP | 2006-230954 | A | 9/2006 |
| JP | 2006-252211 | A | 9/2006 |
| JP | 2008-213568 | A | 9/2008 |
| JP | 2013-184762 | A | 9/2013 |
| JP | 2016-33816 | A | 3/2016 |
| JP | 2016-218733 | A | 12/2016 |
| JP | 2018-197666 | A | 12/2018 |
| JP | 2019-501650 | A | 1/2019 |
| JP | 2019-216674 | A | 12/2019 |
| JP | 2021-14212 | A | 2/2021 |
| JP | 2021-62694 | A | 4/2021 |

* cited by examiner

| ID | OPERATING TIME | LAST AUTOMATIC INSPECTION | INSPECTION RESULT | ELAPSED TIME FROM LAST CLEANING | CHARGE AMOUNT |
|---|---|---|---|---|---|
| #1 | ***** | ***** | SENSOR 1 : G<br>SENSOR 2 : G<br>SENSOR 3 : G<br>SENSOR 4 : G | ** : ** | ** |
| #2 | ***** | ***** | SENSOR 1 : G<br>SENSOR 2 : G<br>SENSOR 3 : G<br>SENSOR 4 : G | ** : ** | ** |
| #3 | ***** | ***** | SENSOR 1 : G<br>SENSOR 2 : G<br>SENSOR 3 : G<br>SENSOR 4 : G | ** : ** | ** |

DELIVERY SYSTEM, DELIVERY METHOD, AND AUTOMATIC TRANSFER DEVICE

TECHNICAL FIELD

The present description discloses a delivery system, a delivery method, and an automatic transfer device.

BACKGROUND ART

Conventionally, as a mobile robot device, there has been proposed a mobile robot device that relates to a system including a base station and a mobile robot device that performs grass cutting or cleaning, in which environmental sensors, such as temperature and precipitation sensors, are disposed in the base station to regulate the deployment of the mobile robot device according to weather conditions (for example, see Patent Literature 1). The system can achieve improvement of the work results of the mobile robot device by minimizing unnecessary work. In addition, as a mobile robot device, there has been proposed a mobile robot device that detects the presence or absence of an abnormality in a drive system due to a traveling motor including a battery based on a current waveform of the battery when traveling on a predetermined traveling path (for example, see Patent Literature 2). The device can appropriately detect an abnormality in the drive system including the electric energy source. Further, as a mobile robot device, there has been proposed a mobile robot device in which an approximate position is detected by ultrasonic measurement and an odometer, a slot-shaped light beam perpendicular to a traveling surface is transmitted from a docking device, and an accurate rotation angle of the mobile robot device is detected by a detector (for example, see Patent Literature 3).

PATENT LITERATURE

Patent Literature 1: JP-A-2019-501650
Patent Literature 2: JP-A-2016-33816
Patent Literature 3: JP-A-2001-508572

BRIEF SUMMARY

Technical Problem

An automatic transfer device may be used in, for example, a delivery system for delivering articles. In the delivery system, the automatic transfer device executes not only delivery work for delivering articles but also work such as standing by between work, device charging process, maintenance inspection work, so that it is desired to operate efficiently. Although Patent Literatures 1 to 3 describe the system using the automatic transfer device, efficient maintenance and operation of the automatic transfer device are not considered.

The present disclosure is made to solve such problems, and a main object of the present disclosure is to provide a delivery system, a delivery method, and an automatic transfer device capable of executing maintenance work more efficiently by utilizing standby time.

The present disclosure employs the following means in order to achieve the main object described above.

The delivery system of the present description is a delivery system configured to deliver an article, the delivery system including an automatic transfer device that includes a detection section configured to detect surroundings, a drive section, and a control section configured to control the drive section, the automatic transfer device being configured to automatically move the article by the drive section in a specific space, in which a standby space where the automatic transfer device is on standby is provided in the specific space, and the delivery system further includes a cleaning device disposed in the standby space, the cleaning device being configured to clean the automatic transfer device while the automatic transfer device is on standby.

In this delivery system, the cleaning device configured to clean the automatic transfer device is disposed in the standby space where the automatic transfer device is on standby, and the automatic transfer device can be cleaned while on standby. In this delivery system, maintenance work can be executed more efficiently by utilizing the standby time.

BRIEF DESCRIPTION OF DRAWINGS

FIG. 2 is a view illustrating an example of logistics center 20.

DESCRIPTION OF EMBODIMENTS

Figure 1:
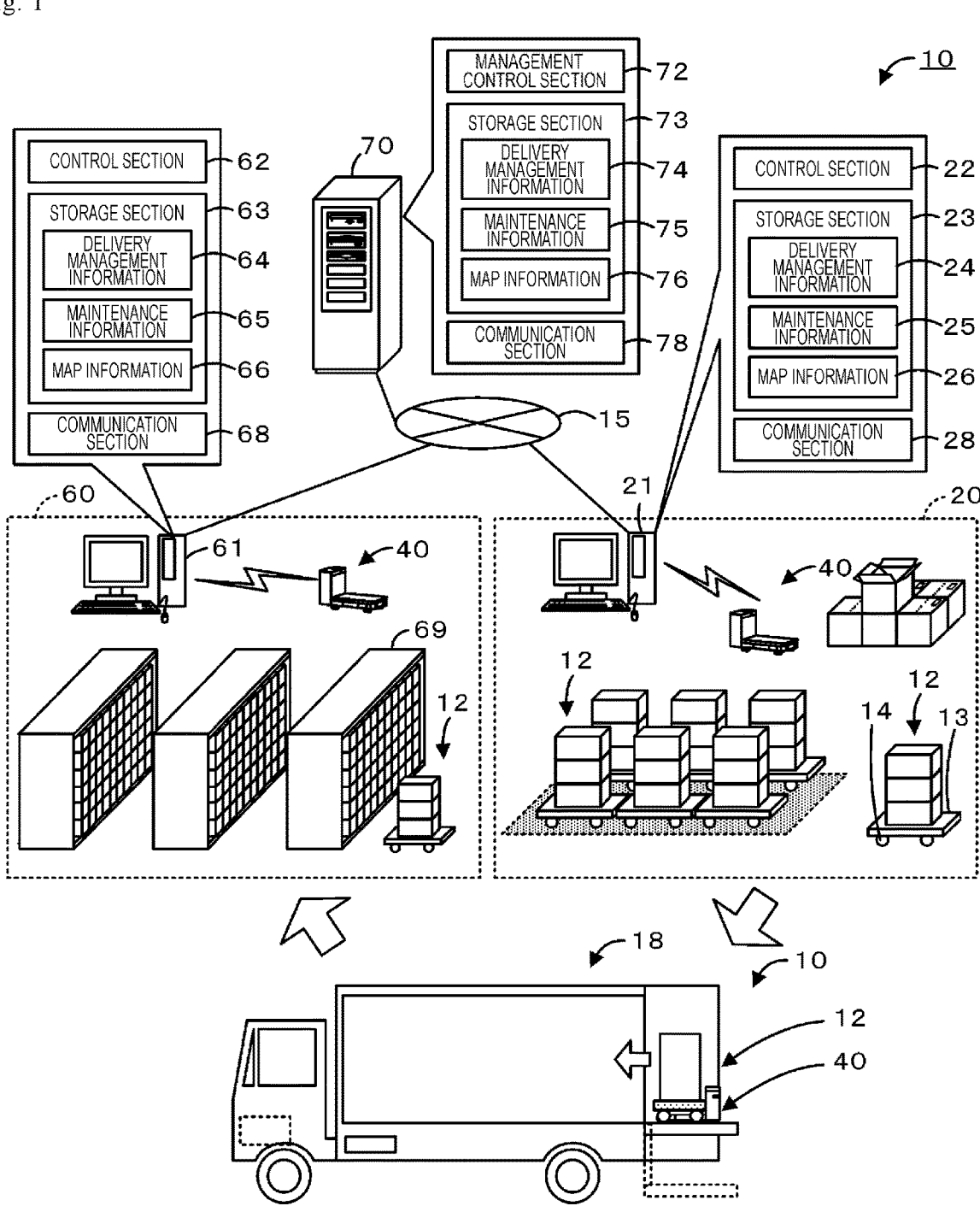
FIG. 1 is a schematic view illustrating an example of delivery system 10.
Figure 2:
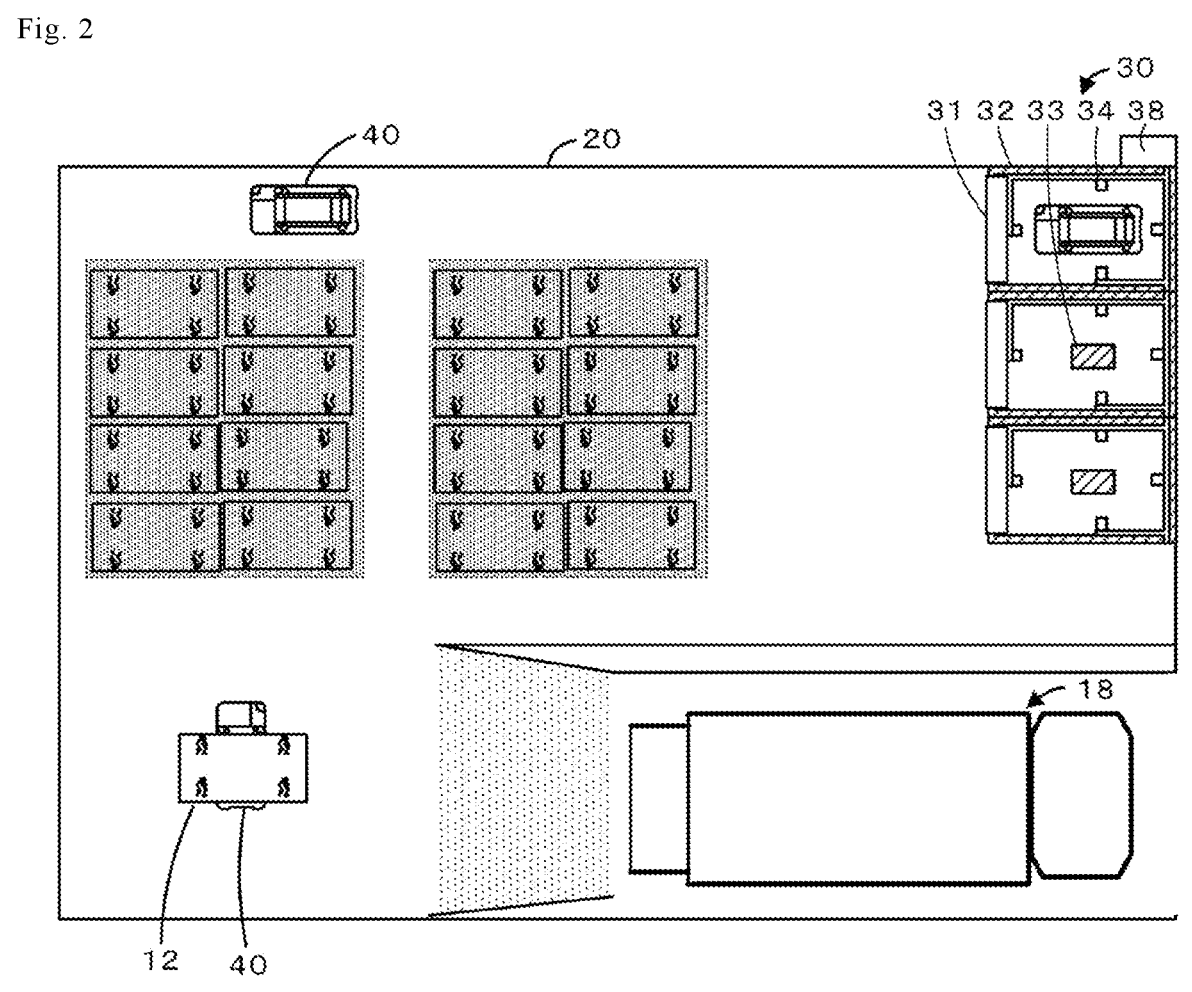
Figure 3:
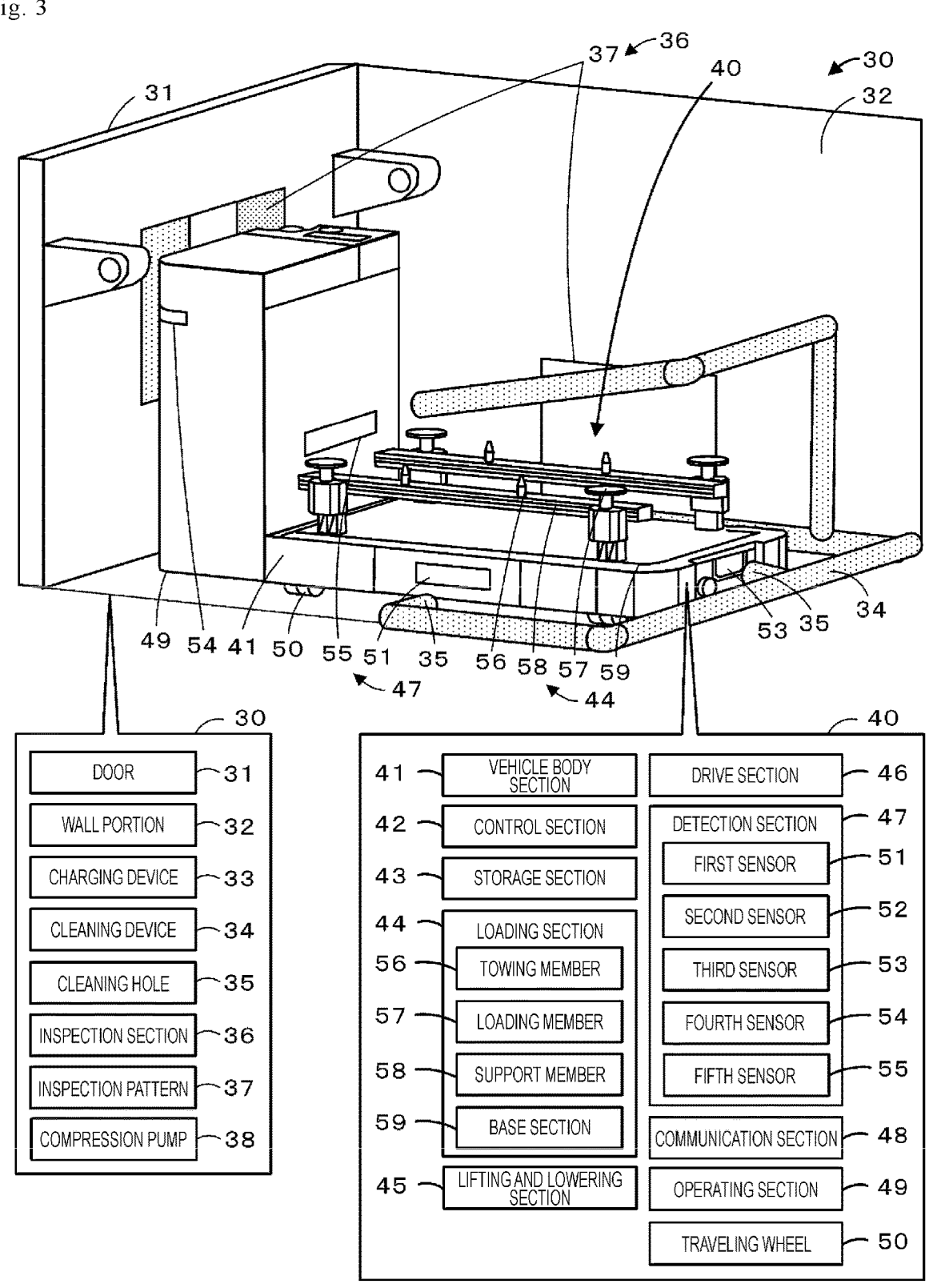
FIG. 3 is a view illustrating an example of standby space 30 and automatic transfer device 40.
Figure 4:
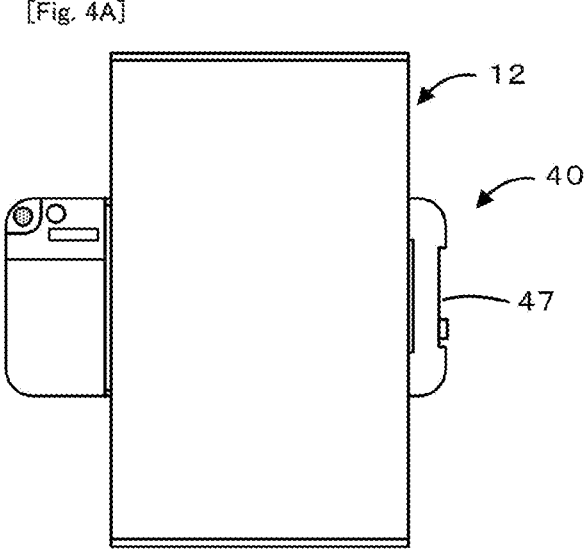
FIG. 4 is a trihedral view of automatic transfer device 40 connected to wheeled platform 12.
Figure 4:
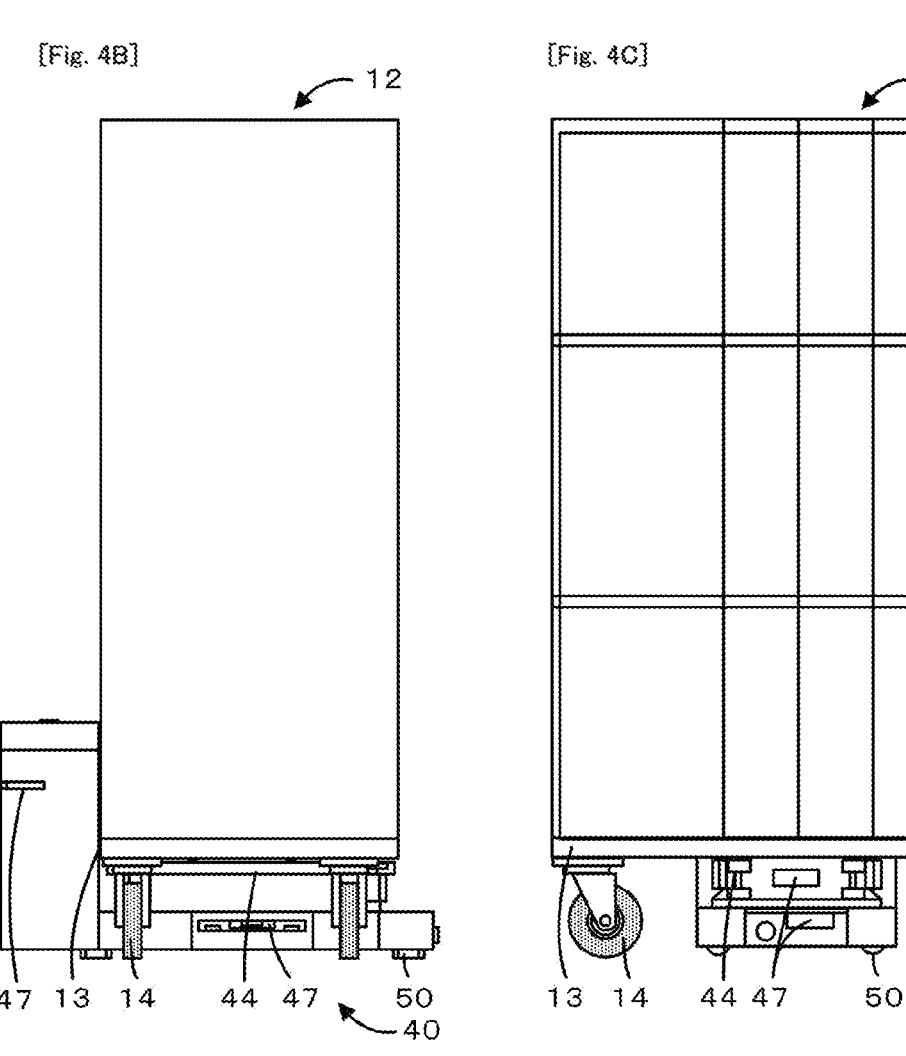
Figure 5:
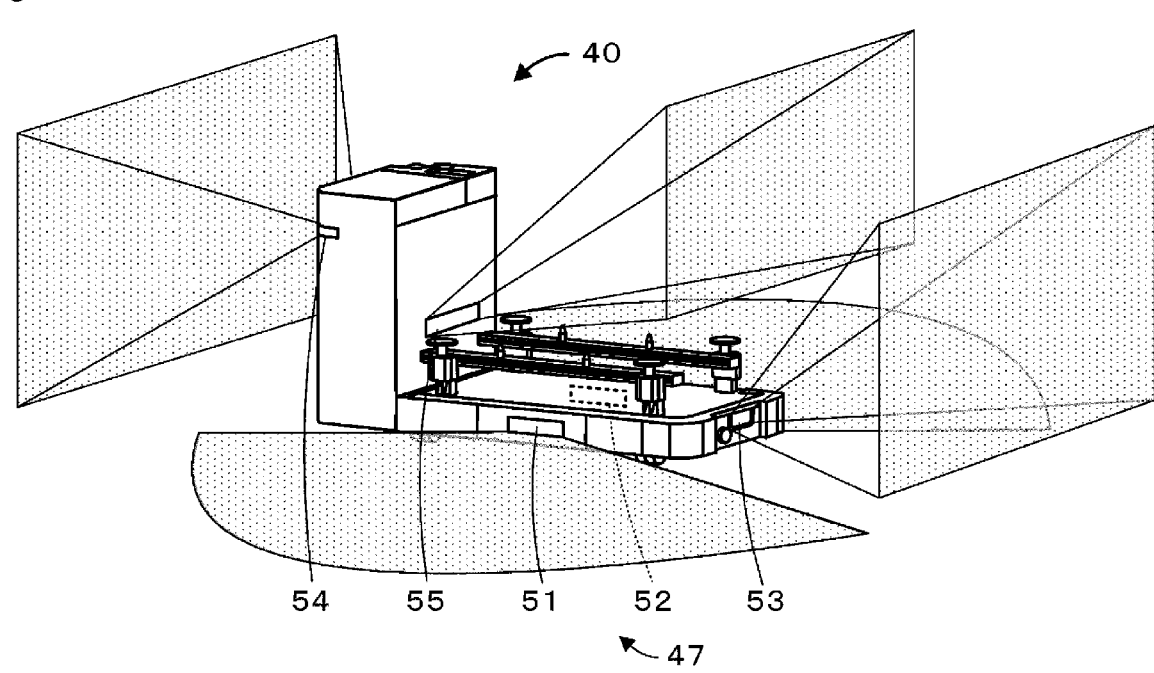
FIG. 5 is a view illustrating an example of a detection range of detection section 47.
Figure 6:
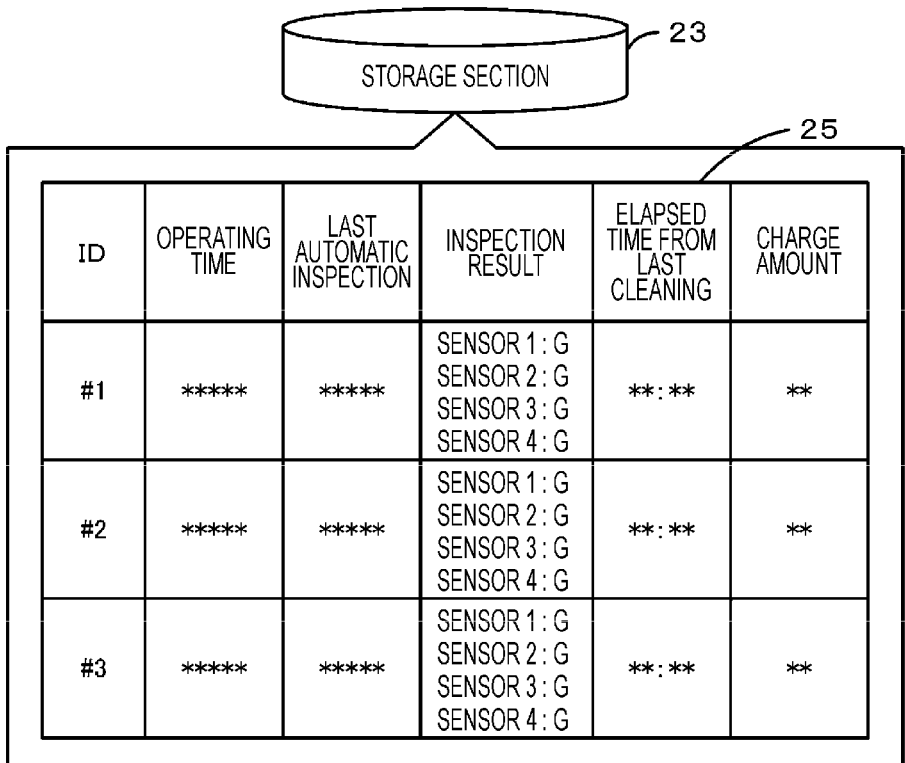
FIG. 6 is a view illustrating an example of maintenance information 25 stored in storage section 23.

Embodiments according to the present disclosure will be described with reference to the drawings. FIG. 1 is a schematic view illustrating an example of delivery system 10. FIG. 2 is a view illustrating an example of logistics center 20. FIG. 3 is a view illustrating an example of standby space 30 and automatic transfer device 40. FIG. 4 is a trihedral view of automatic transfer device 40 connected to wheeled platform 12, in which FIG. 4A is a plan view, FIG. 4B is a front view, and FIG. 4C is a side view. FIG. 5 is a view illustrating an example of a detection range of detection section 47. FIG. 6 is a view illustrating an example of maintenance information 25 stored in storage section 23. Delivery system 10 is a system that includes automatic transfer device 40 configured to automatically move articles in a specific space, and executes a process of delivering the articles. Although delivery system 10 will be described by way of example in which the articles is transported by using wheeled platform 12, the present disclosure is not particularly limited to this, and wheeled platform 12 may be omitted or other components may be used. Here, the "article" is not particularly limited as long as anything is delivered, and for example, examples of the "article" include a machine, a device, an industrial product including units and components of devices, generally used daily consumer products, foods, and fresh products. Examples of a "delivery source" and a "delivery destination" include a logistics center that collects and delivers articles, a warehouse that stores the articles, and a shop that sells the articles. In addition, for example, examples of the "specific space" include a cargo chamber of a mobile transporter for delivering the articles and a work elevator, in addition to the above-described delivery source and delivery destination.

Examples of the mobile transporter include a vehicle such as delivery vehicle 18 and a train, a ship, and an aircraft. For convenience of explanation, delivery system 10 for delivering products such as daily consumer products and fresh products by delivery vehicle 18 from logistics center 20 as the delivery source to shop 60 of the delivery destination will be mainly described.

As illustrated in FIG. 1, delivery system 10 includes logistics PC 21, shop PC 61, automatic transfer device 40, and central control device 70. Delivery system 10 is used in wheeled platform 12, delivery vehicle 18, logistics center 20, shop 60, and the like.

Wheeled platform 12 is a conveyance object used to convey articles, and includes placement section 13 and casters 14 as illustrated in FIGS. 1 and 4. Placement section 13 is a plate-shaped member for loading the articles. Casters 14 have wheels for causing wheeled platform 12 to travel, and are disposed on a lower surface side of placement section 13. Wheeled platform 12 may be a wheeled basket.

Delivery vehicle 18 is a vehicle that is loaded with one or more wheeled platforms 12 and delivers articles. Delivery vehicle 18 delivers the articles between delivery bases. Here, the "delivery base" includes logistics center 20, shop 60, and the like in which the articles are collected. Delivery vehicle 18 loads wheeled platform 12 in cargo chamber at logistics center 20, delivers the articles to the delivery destination, and returns empty wheeled platform 12 to logistics center 20.

Logistics center 20 is a place for collecting articles and delivering the articles to shops 60 or other logistics centers 20 in various locations. As illustrated in FIG. 2, logistics center 20 has one or more automatic transfer devices 40, so that wheeled platform 12 can be automatically moved. Logistics center 20 has, for example, standby space 30 in a specific area of a floor surface, and automatic transfer device 40 is on standby in standby space 30 when not performing work such as moving the articles. In logistics center 20, an operator, an arm robot (not illustrated), or the like performs work for placing the articles on wheeled platform 12 corresponding to the delivery destination. Automatic transfer device 40 performs work for collecting, loading, and unloading wheeled platform 12 for which the delivery destination is specified.

Logistics PC 21 is disposed in logistics center 20 and is configured as a management device that performs product management, and the like in logistics center 20. Logistics PC 21 includes control section 22, storage section 23, and communication section 28. Control section 22 includes CPU and controls the entire device. Storage section 23 stores various application programs and various data files. Storage section 23 stores delivery management information 24, maintenance information 25, map information 26, and the like. Delivery management information 24 is information used for managing delivery of the articles. Maintenance information 25 includes information related to maintenance of automatic transfer device 40 disposed in logistics center 20. As illustrated in FIG. 6, maintenance information 25 is associated with the identifier (ID) of automatic transfer device 40 and includes the operating time of automatic transfer device 40, the last automatic inspection execution time, the inspection result of detection section 47, the elapsed time from the last cleaning, the state of charge (SOC) of the storage battery, and the like. Map information 26 is information of a map of logistics center 20. Communication section 28 wirelessly communicates with an external device such as automatic transfer device 40. Communication section 28 exchanges information with central control device 70 and shop PC 61 via network 15. Logistics PC 21 outputs an execution instruction to cleaning device 34 to execute a cleaning process of automatic transfer device 40, based on the information related to automatic transfer device 40 standing by in standby space 30.

Standby space 30 is configured as a garage on which an automatic transfer device having a floor surface, a ceiling, and a wall surface is on standby. Door 31 and wall portion 32 are disposed in standby space 30. Door 31 is configured to open and close for external access when automatic transfer device 40 enters and exits standby space 30. Door 31 is disposed with an opening and closing device (not illustrated), and is opened and closed in response to signals from automatic transfer device 40 for opening and closing. Wall portion 32 is a member that partitions standby space 30 into spaces for each automatic transfer device 40, and faces a side surface or a rear surface of automatic transfer device 40.

In standby space 30, charging device 33, cleaning device 34, and inspection section 36 are disposed as work devices relating to automatic transfer device 40. Charging device 33 is disposed in standby space 30 and serves as a device that charges a driving storage battery provided in automatic transfer device 40 while automatic transfer device 40 is on standby. Charging device 33 charges the storage battery using any one of the wireless charging methods, for example, an electromagnetic induction method, a magnetic field resonance method, or an electric field coupling method. Alternatively, charging device 33 may be connected by wire using a plug method to charge the storage battery. For example, charging device 33 may start charging when receiving a signal from automatic transfer device 40, or may start charging when a sensor (not illustrated) detects automatic transfer device 40.

Cleaning device 34 is disposed in standby space 30 and serves as a device that cleans automatic transfer device 40 while automatic transfer device 40 is on standby. Cleaning device 34 is configured as an air blow device that removes foreign matter adhered to automatic transfer device 40 using air. As illustrated in FIGS. 2 and 3, cleaning device 34 includes a pipe for supplying air, cleaning hole 35 facing a cleaning portion of automatic transfer device 40, a solenoid valve for opening and closing cleaning hole 35, and compression pump 38 for supplying high-pressure air to cleaning hole 35. For example, cleaning hole 35 may be disposed at a position facing detection section 47 provided in automatic transfer device 40, and detection section 47 may be mainly cleaned. Cleaning holes 35 are provided at positions facing first to fifth sensors 51 to 55, respectively. The solenoid valve and compression pump 38 may be controlled by logistics PC 21. Cleaning device 34 executes a cleaning process of automatic transfer device 40 based on the inspection result obtained using inspection section 36. Cleaning device 34 need only remove foreign matter or dirt adhered to automatic transfer device 40, may be a liquid spray cleaning device that applies a cleaning liquid to the body to wash away foreign matter or dirt, or may be a brush device that scrubs away foreign matter and dirt by applying a brush as a cleaning member against the body.

Inspection section 36 is disposed in standby space 30 and is used when inspecting the function of automatic transfer device 40. Automatic transfer device 40 uses inspection section 36 to execute a functional inspection of automatic transfer device 40 while on standby in standby space 30. Inspection section 36 may include one or more inspection patterns 37 and may be used in an inspection of detection section 47. Inspection pattern 37 is formed on wall portion 32 within a detection range (see FIG. 5) of detection section 47. Inspection pattern 37 may be formed on door 31 as wall portion 32. Inspection sections 36 are provided at positions facing first to fifth sensors 51 to 55, respectively. Inspection pattern 37 is preferably a pattern suitable for the detection method of detection section 47. For example, inspection pattern 37 may be a three-color pattern of RGB when detection section 47 is an imaging camera, or may be a multicolor pattern when detection section 47 is a stereo camera. When detection section 47 is a laser scan sensor or a sonar sensor, inspection pattern 37 may be an achromatic plane or may be wall portion 32 as it is.

Automatic transfer device 40 is a vehicle that automatically moves wheeled platform 12 as a conveyance object. Automatic transfer device 40 enters a space between casters 14 on the lower surface side of placement section 13 of wheeled platform 12 and lifts and loads placement section 13 from below using loading section 44 or is connected to wheeled platform 12 in such a way that automatic transfer device 40 locks into placement section 13 and tows wheeled platform 12, thereby moving wheeled platform 12. Automatic transfer device 40 may be an automatic guided vehicle (AGV) that moves along a line formed on a road surface, or may be an autonomous mobile robot (AMR) that moves on a free route by sensing surroundings. As illustrated in FIG. 3, automatic transfer device 40 includes vehicle body section 41, control section 42, storage section 43, loading section 44, lifting and lowering section 45, drive section 46, detection section 47, operating section 49, and traveling wheels 50.

Vehicle body section 41 is a plate-shaped body that enters a lower surface of wheeled platform 12, and traveling wheels 50 are disposed on a lower surface side and loading section 44 is disposed on an upper surface side. Control section 42 is a controller for controlling the entire device of automatic transfer device 40. Control section 42 outputs control signals and the like to lifting and lowering section 45, drive section 46, detection section 47, and communication section 48, and inputs signals from detection section 47, and communication section 48. Control section 42 obtains a moving direction, a moving distance, a current position, and the like of automatic transfer device 40 based on a driving state of drive section 46 and the like. Control section 42 controls the movement or stoppage of automatic transfer device 40 based on the information from detection section 47. Storage section 43 stores various application programs and various data files. Storage section 43 stores, for example, position information including positions of a delivery source and a delivery destination to which wheeled platform 12 is moved, map information of logistics center 20, and the like. The position information and the map information are acquired by communication from logistics PC 21. Communication section 48 is an interface that wirelessly exchanges information with an external device such as logistics PC 21. Control section 42 exchanges information with logistics PC 21 via communication section 48. Automatic transfer device 40 outputs information related to its own cleaning and/or information related to an inspection of detection section 47 to logistics PC 21 via communication section 48. Operating section 49 is connected to an end portion of vehicle body section 41, and is a housing erected higher than vehicle body section 41 adjacent loading section 44. Inside operating section 49, control section 42, storage section 43, communication section 48, a storage battery, and the like are accommodated.

Loading section 44 is connected to wheeled platform 12 by moving upward from vehicle body section 41 of automatic transfer device 40 and pressing or locking into the lower surface of placement section 13 (see FIG. 4). Loading section 44 includes towing member 56, loading member 57, support member 58, and base section 59. Towing member 56 locks into an unevenness formed on the lower surface of placement section 13, and is used when moving wheeled platform 12 in a state where casters 14 are grounded, serving as a so-called pin-shaped member used when towing wheeled platform 12. Towing member 56 is disposed at four positions on an upper surface of support members 58 so that towing members 56 can locks the lower surface of placement section 13 in the front-rear and left-right directions. Loading member 57 is a plate-shaped member used when moving wheeled platform 12 in a loaded state where wheeled platform 12 is lifted. Loading member 57 is disposed at four positions on an upper surface of base section 59 so that loading members 57 can stably lift wheeled platform 12. Base section 59 is an integral structure in which all loading members 57 are disposed, and is lifted and lowered by lifting and lowering section 45. Support members 58 are two columnar-shaped members, and each is bridged in the vicinity of a pair of loading members 57. Support members 58 move up and down with respect to loading members 57. In loading section 44, loading members 57 are lifted and lowered in accordance with the lifting and lowering movement of base section 59, and further, towing members 56 are lifted and lowered in accordance with the lifting and lowering movement of support members 58.

Drive section 46 is a motor that is connected to each of traveling wheels 50 and rotationally drives connected traveling wheels 50, thereby driving automatic transfer device 40 to travel. Automatic transfer device 40 includes four traveling wheels 50, and moves by rotational driving of traveling wheels 50. Traveling wheels 50 may also be mecanum wheels or omni wheels that can be moved vertically and horizontally by independent driving of four wheels. From the viewpoint of the degree of freedom of movement, it is more preferable that traveling wheels 50 are mecanum wheels. Detection section 47 detects an object present around automatic transfer device 40 or a distance from the object. Detection section 47 may detect the presence of the object or the distance from the object, for example, by irradiating light such as a laser, or a sound wave into the surroundings, and detecting a reflected wave. Detection section 47 may include one or more of a laser scan sensor, an imaging camera, a stereo camera, and a sonar sensor, for example. In the AGV, detection section 47 is a sensor that senses an object present in the vicinity of vehicle body section 41, and in the AMR, detection section 47 is a sensor that can sense an obstacle, a wall, or the like present in a larger area. In automatic transfer device 40, first sensor 51 and second sensor 52 are disposed in front and rear of vehicle body section 41, third sensor 53 is disposed on a side surface of vehicle body section 41, and fourth sensor 54 is disposed on a front surface of operating section 49. Fifth sensor 55 that senses wheeled platform 12 is disposed on a surface of operating section 49 on loading section 44 side.

As illustrated in FIG. 1, shop 60 displays and sells the delivered articles. Shop 60 has one or more automatic transfer devices 40, so that wheeled platform 12 can be automatically moved. Shop 60 also has standby space 30 described above. Shop 60 has display shelf 69 on which the articles are displayed, and an operator displays the articles on the display shelf. Shop PC 61 is disposed in shop 60 and is configured as a management device that performs product management or the like in shop 60. Shop PC 61 includes control section 62, storage section 63, and communication section 68. Control section 62 includes CPU and controls the entire device. Storage section 63 stores various application programs and various data files. Storage section 63 stores delivery management information 64, maintenance information 65, map information 66, and the like. Delivery management information 64 is information used for managing delivery of the articles. Maintenance information 65 includes information related to maintenance of automatic transfer device 40 disposed in shop 60. Map information 66 is information of a map of shop 60. Communication section 68 wirelessly communicates with an external device such as automatic transfer device 40. Communication section 68 exchanges information with central control device 70 and logistics PC 21 via network 15.

Central control device 70 is a device that manages delivery system 10. Central control device 70 includes control section 72, storage section 73, and communication section 78. Control section 72 includes CPU and controls the entire device. Storage section 73 stores various application programs and various data files. Storage section 73 stores delivery management information 74 that is a database used for managing delivery of articles, maintenance information 75 that is a database including information related to maintenance of automatic transfer device 40 disposed in logistics center 20 or shop 60, map information 76 that is a database of a map of logistics center 20 or shop 60, and the like. Communication section 78 exchanges information with an external device such as logistics PC 21 and shop PC 61 via network 15.

Next, in delivery system 10 configured as described above, a process in which automatic transfer device 40 moves wheeled platform 12 at logistics center 20 will be described first. Here, a process in which automatic transfer device 40 functioning as the AMR moves wheeled platform 12 to delivery vehicle 18 will be described as a specific example. When this process is started, first, control section 22 of logistics PC 21 selects automatic transfer device 40 that is configured to automatically move, and outputs a current position of wheeled platform 12 to be moved and a target position of the movement destination to automatic transfer device 40. Automatic transfer device 40 moves to the current position of wheeled platform 12, and after detection section 47 detects wheeled platform 12, vehicle body section 41 is inserted below wheeled platform 12, and loading section 44 is lifted to engage with wheeled platform 12. Next, automatic transfer device 40 automatically travels to the target position, and when automatic transfer device 40 arrives at the target position, automatic transfer device 40 lowers loading section 44. Logistics PC 21 and automatic transfer device 40 repeatedly execute such work.

Figure 7:
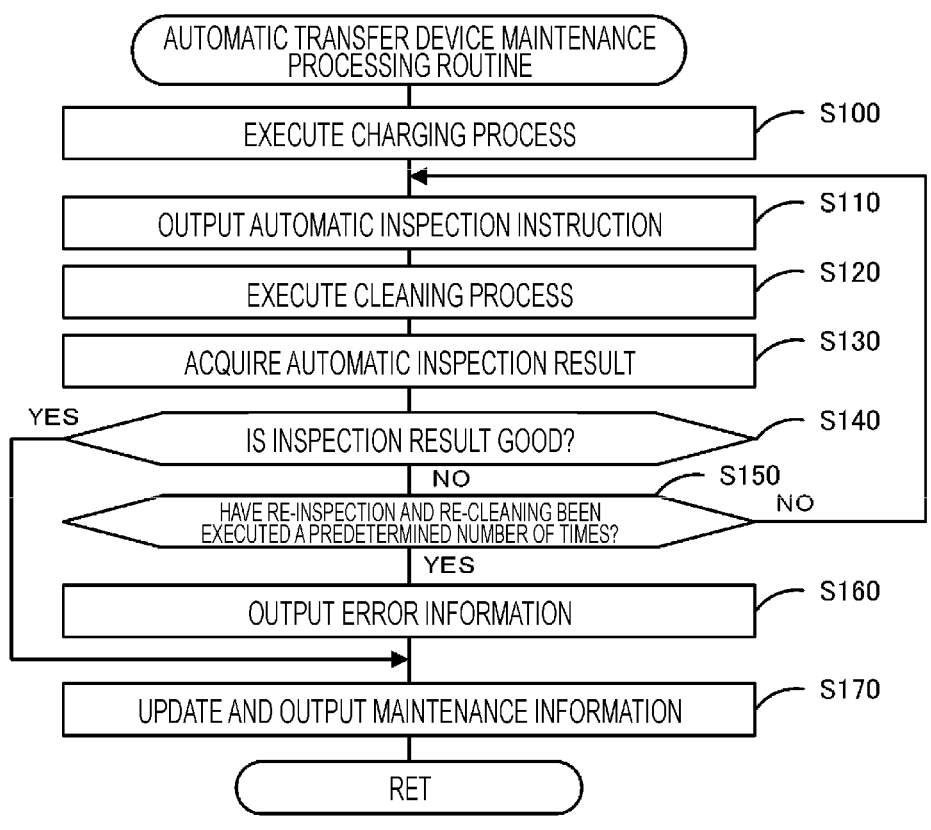
FIG. 7 is a flowchart illustrating an example of an automatic transfer device maintenance processing routine.

Next, a process in which automatic transfer device 40 is on standby in standby space 30 in logistics center 20 will be described. Automatic transfer device 40 moves to standby space 30 and stands by when not performing its own work (see FIG. 3). FIG. 7 is a flowchart illustrating an example of an automatic transfer device maintenance processing routine executed by control section 22 of logistics PC 21. This routine is stored in storage section 23, and is executed after automatic transfer device 40 is accommodated in standby space 30. When this routine is started, control section 22 causes charging device 33 to execute a process of charging the storage battery of automatic transfer device 40 (S100). Charging device 33 starts charging the storage battery. When charging device 33 detects completion of charging of the storage battery, charging device 33 ends this charging process.

Next, control section 22 outputs an execution instruction to automatic transfer device 40 to execute an automatic inspection (S110). Automatic transfer device 40 receiving the execution instruction of the automatic inspection executes an inspection of detection section 47. For example, as the inspection of detection section 47, control section 42 of automatic transfer device 40 determines whether a distance to inspection pattern 37 has changed beyond a predetermined margin with respect to the initial value, whether an RGB value of an imaging element of the camera has changed beyond a predetermined margin with respect to the initial value, and the like based on an actual measurement value. Control section 22 outputs an instruction to cleaning device 34 to clean automatic transfer device 40 (S120). Upon receiving this instruction, cleaning device 34 drives compression pump 38, opens the electromagnetic valve of cleaning hole 35, and cleans detection section 47 using air blow.

Next, control section 22 acquires the result of the automatic inspection from automatic transfer device 40 (S130), and determines whether the inspection result is good (S140). When all the inspection results are good, control section 22 updates maintenance information 25 based on the operating time, the time at which the last automatic inspection and cleaning are executed, the inspection results, and the like, outputs updated maintenance information 25 to central control device 70 (S170), and ends this routine. On the other hand, when the inspection result is not good in S140, control section 22 determines whether a re-inspection and a re-cleaning process have been executed a predetermined number of times (S150). It is assumed that the predetermined number of times is empirically determined to a value such as two times, three times, or five times, where the inspection result of detection section 47 improves due to cleaning. When the re-inspection and the re-cleaning process have not been executed a predetermined number of times, control section 22 repeatedly executes the processing of S110 and thereafter. That is, the automatic inspection and the cleaning process are executed again. When the function of detection section 47 is recovered by the re-cleaning process, the inspection result is determined to be good in S140. On the other hand, when the inspection result is not good even if the re-inspection and the re-cleaning process are executed a predetermined number of times in S150, control section 22 displays and outputs error information of detection section 47 (S160), updates and outputs maintenance information 25 in S170, and ends this routine. An operator who checked the error information executes a detailed inspection and a detailed maintenance of automatic transfer device 40.

Here, a correspondence relationship between the elements of the present embodiment and the elements of the present disclosure will be clarified. Standby space 30 of the present embodiment corresponds to the standby space of the present disclosure, cleaning device 34 corresponds to the cleaning device, inspection section 36 corresponds to inspection section, charging device 33 corresponds to the charging device, logistics PC 21, shop PC 61, and central control device 70 correspond to the management device, and logistics center 20 and shop 60 correspond to the specific space. In addition, detection section 47 corresponds to the detection section, drive section 46 corresponds to the drive section, control section 42 corresponds to the control section, automatic transfer device 40 corresponds to the automatic transfer device, and delivery system 10 corresponds to the delivery system. In the present embodiment, an example of the delivery method according to the present disclosure is also clarified by describing an operation of delivery system 10.

In delivery system 10 of the present embodiment described above, standby space 30 where automatic transfer device 40 is on standby is provided in logistics center 20 or shop 60 as a specific space, and cleaning device 34 that cleans automatic transfer device 40 while automatic transfer device 40 is on standby is disposed in the standby space. In delivery system 10, it is possible to clean automatic transfer device 40 while on standby. In delivery system 10, maintenance work can be executed more efficiently by utilizing the standby time. Further, since cleaning device 34 includes one or more of an air blow device, a liquid spray cleaning device, and a brush device, automatic transfer device 40 can be cleaned by using air blow, liquid, a brush, or the like. Further, standby space 30 is provided with inspection section 36 used when inspecting a function of automatic transfer device 40, and it is possible that automatic transfer device 40 uses inspection section 36 to execute a functional inspection of automatic transfer device 40 while on standby in standby space 30. Furthermore, standby space 30 has wall portion 32 facing automatic transfer device 40, wall portion 32 is formed with inspection pattern 37, which is used as inspection section 36, detected by detection section 47 of automatic transfer device 40, and automatic transfer device 40 uses inspection pattern 37 to execute an inspection of detection section 47 of automatic transfer device 40. In delivery system 10, inspection pattern 37 can be used to execute an inspection of the sensor functionality of automatic transfer device 40 while on standby. Since detection section 47 includes one or more of a laser scan sensor, an imaging camera, and a sonar sensor, delivery system 10 can execute an inspection of the sensor.

In addition, cleaning device 34 executes a cleaning process of automatic transfer device 40 based on the inspection result obtained using inspection section 36. In delivery system 10, for example, since it is possible to immediately clean or refrain from cleaning according to the inspection result of automatic transfer device 40, maintenance work can be executed more efficiently. In delivery system 10, when the inspection result of detection section 47 is not good, it is possible to execute a functional recovery of automatic transfer device 40 by executing a cleaning process using cleaning device 34. Further, in delivery system 10, since the inspection using inspection section 36 is executed after the cleaning process of automatic transfer device 40 is executed, a better inspection result can be obtained. Furthermore, delivery system 10 includes logistics PC 21, shop PC 61, and central control device 70 as management devices that manage information related to delivery system 10, and automatic transfer device 40 outputs information related to cleaning of automatic transfer device 40 and/or maintenance information related to an inspection of detection section 47 to the management devices. In delivery system 10, since the execution of inspection and the omission of inspection can be performed based on the managed maintenance information, maintenance work can be more efficiently executed. In addition, in delivery system 10, charging device 33 that charges automatic transfer device 40 while automatic transfer device 40 is on standby is disposed in standby space 30. In delivery system 10, since charging device 33 is provided in standby space 30, maintenance work can be executed while charging automatic transfer device 40 while on standby.

Further, automatic transfer device 40 includes detection section 47 that detects surroundings, drive section 46 that drives automatic transfer device 40, and control section 42 that controls drive section 46, and delivery system 10 is provided with standby space 30 where automatic transfer device 40 is on standby in the specific space, standby space 30 is provided with inspection section 36 used when inspecting a function of automatic transfer device 40, and control section 42 is configured to execute a functional inspection of automatic transfer device 40 using inspection section 36 while automatic transfer device 40 is on standby in standby space 30. In automatic transfer device 40, it is possible to inspect automatic transfer device 40 while on standby. In automatic transfer device 40, maintenance work can be executed more efficiently by utilizing the standby time.

Furthermore, since standby space 30 forms a garage surrounded by door 31, wall portion 32, and the ceiling, theft of automatic transfer device 40 can be prevented, for example. Door 31 opens and closes in response to signals from automatic transfer device 40, allowing entering and exiting standby space 30 under the initiative of automatic transfer device 40.

It is needless to say that the present disclosure is not limited in any way to the above-described embodiment, and the present disclosure can be embodied in various aspects as long as the aspects fall within the technical scope of the present disclosure.

For example, in the above-described embodiment, delivery system 10 is provided with cleaning device 34 and inspection section 36 in standby space 30; and, however, the present disclosure is not particularly limited thereto, and either cleaning device 34 or inspection section 36 may be omitted. In delivery system 10, when cleaning device 34 is disposed in standby space 30, automatic cleaning of automatic transfer device 40 can be performed, and when inspection section 36 is disposed in standby space 30, an automatic inspection of automatic transfer device 40 can be performed. In delivery system 10, charging device 33 is provided in standby space 30, but the present disclosure is not particularly limited thereto, and charging device 33 need not be provided. In delivery system 10, it is preferable to include charging device 33, cleaning device 34, and inspection section 36 in standby space 30 from the viewpoint of efficiency of maintenance.

In the above-described embodiment, inspection section 36 is formed on wall portion 32, but the present disclosure is not particularly limited thereto, and inspection section 36 may be formed on a portion other than wall portion 32. While standby space 30 is described to include door 31 and wall portion 32, configuration is not particularly limited thereto as long as charging device 33, cleaning device 34, inspection section 36, and the like are disposed, and may be an open space omitting door 31, wall portion 32, the ceiling, and the like. Also in delivery system 10, it is possible to execute maintenance work more efficiently by utilizing the standby time.

In the above-described embodiment, cleaning device 34 executes a cleaning process of automatic transfer device 40 based on the inspection result obtained using inspection section 36, for example, when the inspection result is not good; however, the present disclosure is not particularly limited thereto, and such a process may be omitted. For example, delivery system 10 may perform the cleaning process and the inspection process separately. Also in delivery system 10, maintenance work can be executed more efficiently by utilizing the standby time.

In the above-described embodiment, when automatic transfer device 40 is on standby in standby space 30, a charging process, an automatic inspection process, and a cleaning process are always executed; however, the present disclosure is not particularly limited thereto, and unnecessary processes among these processes may be omitted based on any of maintenance information 25, 65, and 75, for example. That is, delivery system 10 may include logistics PC 21, shop PC 61, and central control device 70 as management devices that manage information of delivery system 10, and the management device may output an execution instruction to cleaning device 34 to execute a cleaning process of automatic transfer device 40, based on maintenance information related to automatic transfer device 40 standing by in standby space 30. At this time, the management device may output an execution instruction to execute the cleaning process when a predetermined time has elapsed from the previous cleaning process. In delivery system 10, more efficient maintenance work can be executed by omitting unnecessary cleaning processes. In addition, the management device may output an execution instruction to automatic transfer device 40 to execute an inspection process of automatic transfer device 40, based on maintenance information related to automatic transfer device 40 standing by in standby space 30. At this time, the management device may output an execution instruction to execute the inspection process when a predetermined time has elapsed from the previous inspection process. In delivery system 10, more efficient maintenance work can be executed by omitting unnecessary inspection processes.

In the above-described embodiment, logistics PC 21, shop PC 61, and central control device 70 are provided as management devices; however, the present disclosure is not particularly limited thereto, and when the functions of this management device are integrated into automatic transfer device 40, the management device may be omitted. In delivery system 10, the management device may be omitted, a detection section may be provided in cleaning device 34, and cleaning device 34 may automatically execute a cleaning process when automatic transfer device 40 enters standby space 30. In delivery system 10, the management device may be omitted, and a detection section may be provided in charging device 33, and charging device 33 may automatically execute a charging process when automatic transfer device 40 enters standby space 30. In delivery system 10, the management device may be omitted, and control section 42 may automatically execute an inspection process when automatic transfer device 40 enters standby space 30. When the management device is omitted in delivery system 10, a process of outputting information such as maintenance information to the management device may also be omitted.

In the above-described embodiment, the present disclosure has been described as delivery system 10, but the configuration is not particularly limited thereto, and may be a delivery method. The delivery method may be configured as follows. For example, the delivery method of the present disclosure may be a delivery method for delivering an article by using an automatic transfer device, the automatic transfer device including a detection section configured to detect surroundings, a drive section, and a control section configured to control the drive section, the automatic transfer device being configured to automatically move the article by the drive section in a specific space, in which a standby space where the automatic transfer device is on standby is provided in the specific space, the delivery method includes a step of cleaning the automatic transfer device using a cleaning device disposed in the standby space while the automatic transfer device is on standby. Alternatively, the delivery method of the present disclosure may be a delivery method, in which a standby space where the automatic transfer device is on standby is provided in the specific space, the standby space is provided with an inspection section used when inspecting a function of the automatic transfer device, and the delivery method includes a step of executing a functional inspection of the automatic transfer device by the automatic transfer device configured to use the inspection section while the automatic transfer device is on standby in the standby space.

In the above-described embodiment, the present disclosure has been described as delivery system 10, but the configuration is not particularly limited thereto, and may be automatic transfer device 40. The automatic transfer device may be configured as follows. For example, the automatic transfer device of the present disclosure may be an automatic transfer device used in a delivery system for delivering articles, the automatic transfer device being for automatically moving the articles in a specific space, the automatic transfer device including a detection section configured to detect surroundings, a drive section configured to drive the automatic transfer device, and a control section configured to control the drive section, in which the delivery system is provided with a standby space where the automatic transfer device is on standby in the specific space, and the standby space is provided with an inspection section used when inspecting a function of the automatic transfer device, and the control section is configured to execute a functional inspection of the automatic transfer device by using the inspection section while the automatic transfer device is on standby in the standby space. In the automatic transfer device, an inspection section used for inspection of the automatic transfer device is disposed in the standby space where the automatic transfer device is on standby, and the automatic transfer device can be inspected while on standby. In the automatic transfer device, maintenance work can be executed more efficiently by utilizing the standby time.

INDUSTRIAL APPLICABILITY

The delivery system, the delivery method, and the automatic transfer device of the present disclosure can be used in the technical field of a logistics system for delivering articles.

REFERENCE SIGNS LIST

10: delivery system, 12: wheeled platform, 13: placement section, 14: caster, 15: network, 18: delivery vehicle, 20: logistics center, 21: logistics PC, 22: control section, 23: storage section, 24: delivery management information, 25: maintenance information, 26: map information, 28: communication section, 30: standby space, 31: door, 32: wall portion, 33: charging device, 34: cleaning device, 35: cleaning hole, 36: inspection section, 37: inspection pattern, 38: compression pump, 40: automatic transfer device, 41: vehicle body section, 42: control section, 43: storage section, 44: loading section, 45: lifting and lowering section, 46: drive section, 47: detection section, 48: communication section, 49: operating section, 50: traveling wheel, 51: first sensor, 52: second sensor, 53: third sensor, 54: fourth sensor, 55: fifth sensor, 56: towing member, 57: loading member, 58: support member, 59: base section, 60: shop, 61: shop PC, 62: control section, 63: storage section, 64: delivery management information, 65: maintenance information, 66: map information, 68: communication section, 69: display shelf, 70: central control device, 72: control section, 73: storage section, 74: delivery management information, 75: maintenance information, 76: map information, 78: communication section.

The invention claimed is:

1. A delivery system configured to deliver an article, the delivery system comprising:

an automatic transfer device including a detection section configured to detect surroundings, a drive section, and a control section configured to control the drive section, the automatic transfer device being configured to automatically move the article by the drive section in a specific space, wherein a standby space where the automatic transfer device is on standby is provided in the specific space, the delivery system further comprises a cleaning device disposed in the standby space, the cleaning device being configured to clean the automatic transfer device while the automatic transfer device is on standby, the standby space is provided with an inspection section used when inspecting a function of the automatic transfer device, the automatic transfer device is configured to use the inspection section to execute an inspection of a function of the automatic transfer device while on standby in the standby space, the delivery system further comprises a management device configured to manage information of the delivery system, and the management device is configured to output an instruction to the automatic transfer device to automatically inspect the function of the automatic transfer device using the inspection section while the automatic transfer device is on standby, output an instruction to the cleaning device to clean the automatic transfer device while the automatic transfer device is on standby, acquire an automatic inspection result from automatic transfer device, determine whether the automatic inspection result satisfies a predetermined condition, when the automatic inspection result satisfies the predetermined condition, update and output maintenance information, when the automatic inspection does not satisfy the predetermined condition, determine whether a re-inspection and re-cleaning process has been executed a predetermined number of times, when the re-inspection and re-cleaning process has been executed less than the predetermined number of times, execute the re-inspection and re-cleaning process, and when a re-inspection and a re-cleaning process has been executed the predetermined number of times, display and output error information.

2. The delivery system according to claim 1, wherein the cleaning device includes one or more of an air blow device, a liquid spray cleaning device, and a brush device.

3. The delivery system according to claim 1, wherein a wall configured to face the automatic transfer device is provided in the standby space, and the wall is formed with an inspection pattern, as the inspection section, configured to be detected by the detection section of the automatic transfer device, and the automatic transfer device is configured to use the inspection pattern to execute an inspection of the detection section of the automatic transfer device.

4. The delivery system according to claim 1, wherein the detection section includes one or more of a laser scan sensor, an imaging camera, and a sonar sensor.

5. The delivery system according to claim 1, further comprising:

a charging device disposed in the standby space, the charging device being configured to charge the automatic transfer device while the automatic transfer device is on standby.

6. A delivery system configured to deliver an article, the delivery system comprising:

an automatic transfer device including a detection section configured to detect surroundings, the automatic transfer device being configured to automatically move the article in a specific space, wherein a standby space where the automatic transfer device is on standby is provided in the specific space, the standby space is provided with a cleaning device configured to clean the automatic transfer device while the automatic transfer device is on standby in the standby space, and an inspection section used when inspecting a function of the automatic transfer device, the automatic transfer device is configured to use the inspection section to execute an inspection of a function of the automatic transfer device while on standby in the standby space, the delivery system further comprises a management device configured to manage information of the delivery system, and the management device is configured to output an instruction to the automatic transfer device to automatically inspect the function of the automatic transfer device using the inspection section while the automatic transfer device is on standby, output an instruction to the cleaning device to clean the automatic transfer device while the automatic transfer device is on standby, acquire an automatic inspection result from automatic transfer device, determine whether the automatic inspection result satisfies a predetermined condition, when the automatic inspection result satisfies the predetermined condition, update and output maintenance information, when the automatic inspection does not satisfy the predetermined condition, determine whether a re-inspection and re-cleaning process has been executed a predetermined number of times, when the re-inspection and re-cleaning process has been executed less than the predetermined number of times, execute the re-inspection and re-cleaning process, and when a re-inspection and a re-cleaning process has been executed the predetermined number of times, display and output error information.

7. The delivery system according to claim 6, wherein a wall configured to face the automatic transfer device is provided in the standby space, and the wall is formed with an inspection pattern, as the inspection section, configured to be detected by the detection section of the automatic transfer device, and

the automatic transfer device is configured to use the inspection pattern to execute an inspection of the detection section of the automatic transfer device.

8. A delivery method for delivering an article by using an automatic transfer device, the automatic transfer device including a detection section configured to detect surroundings, a drive section, and a control section configured to control the drive section, the automatic transfer device being configured to automatically move the article by the drive section in a specific space, wherein a standby space where the automatic transfer device is on standby is provided in the specific space, the delivery method comprises:

automatically inspecting a function of the automatic transfer device using an inspection section disposed in the standby space while the automatic transfer device is on standby;

cleaning the automatic transfer device using a cleaning device disposed in the standby space while the automatic transfer device is on standby;

acquiring an automatic inspection result from automatic transfer device;

determining whether the automatic inspection result satisfies a predetermined condition;

when the automatic inspection result satisfies the predetermined condition, updating and outputting maintenance information;

when the automatic inspection does not satisfy the predetermined condition, determining whether a re-inspection and re-cleaning process has been executed a predetermined number of times;

when the re-inspection and re-cleaning process has been executed less than the predetermined number of times, executing the re-inspection and re-cleaning process; and when a re-inspection and a re-cleaning process has been executed the predetermined number of times, displaying and outputting error information.

9. An automatic transfer device used in a delivery system configured to deliver an article, the automatic transfer device being configured to automatically move the article in a specific space, the automatic transfer device comprising:

a detection section configured to detect surroundings;

16 a drive section configured to drive the automatic transfer device; and a control section configured to control the drive section, wherein the delivery system is provided with a management device configured to manage information of the delivery system, and a standby space where the automatic transfer device is on standby in the specific space, and the standby space is provided with an inspection section used when inspecting a function of the automatic transfer device, and a cleaning device configured to clean the automatic transfer device while the automatic transfer device is on standby, and the management device is configured to output an instruction to the control section to automatically execute an inspection of a function of the automatic transfer device using the inspection section while the automatic transfer device is on standby, output an instruction to the cleaning device to clean the automatic transfer device while the automatic transfer device is on standby, acquire an automatic inspection result from automatic transfer device, determine whether the automatic inspection result satisfies a predetermined condition, when the automatic inspection result satisfies the predetermined condition, update and output maintenance information, when the automatic inspection does not satisfy the predetermined condition, determine whether a re-inspection and re-cleaning process has been executed a predetermined number of times, when the re-inspection and re-cleaning process has been executed less than the predetermined number of times, execute the re-inspection and re-cleaning process, and when a re-inspection and a re-cleaning process has been executed the predetermined number of times, display and output error information.

* * * * *